United States Patent
Felix et al.

(10) Patent No.: US 6,233,231 B1
(45) Date of Patent: *May 15, 2001

(54) DATA TRANSMISSION WITHIN A SPREAD-SPECTRUM COMMUNICATION SYSTEM

(75) Inventors: Kenneth A. Felix, Crystal Lake; Mark C. Cudak, McHenry; Amitava Ghosh, Vernon Hills, all of IL (US)

(73) Assignee: Motorola, Inc., Schaumbrug, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/204,702

(22) Filed: Dec. 3, 1998

(51) Int. Cl.[7] .................................................. H04J 13/00
(52) U.S. Cl. .......................................... 370/335; 375/130
(58) Field of Search ................................... 375/130, 135, 375/146, 134, 133, 141, 295; 370/206, 208, 209, 320, 335, 342, 431, 441, 479, 524, 264; 455/522, 456, 457, 427, 450, 524

(56) References Cited

U.S. PATENT DOCUMENTS

| | | | |
|---|---|---|---|
| 5,204,874 | * | 4/1993 | Falconer et al. ...................... 375/200 |
| 5,537,397 | * | 7/1996 | Abramson ............................ 370/441 |
| 5,594,718 | * | 1/1997 | Weaver, Jr. et al. ................. 370/331 |
| 5,719,900 | * | 2/1998 | Dixon et al. ......................... 375/208 |
| 5,754,537 | * | 5/1998 | Jamal ................................... 370/330 |
| 5,812,938 | * | 9/1998 | Gilhousen et al. ..................... 455/69 |
| 5,841,806 | * | 11/1998 | Gilhousen et al. ................... 375/206 |
| 5,903,597 | * | 5/1999 | Pon ...................................... 375/209 |
| 5,930,366 | * | 7/1999 | Jamal et al. ............................ 380/48 |
| 5,940,430 | * | 8/1999 | Love et al. ........................... 375/200 |
| 5,946,344 | * | 8/1999 | Warren et al. ....................... 375/207 |
| 5,956,368 | * | 9/1999 | Jamal et al. .......................... 375/206 |
| 5,956,641 | * | 9/1999 | Bruckert et al. ..................... 455/442 |
| 5,970,413 | * | 10/1999 | Gilhousen ........................... 455/456 |
| 5,991,627 | * | 11/1999 | Honkasalo et al. ................... 455/437 |
| 6,034,635 | * | 3/2000 | Gilhousen ........................... 342/457 |
| 6,108,369 | * | 8/2000 | Ovesjo et al. ....................... 375/146 |

* cited by examiner

Primary Examiner—Chi Pham
Assistant Examiner—Emmanuel Bayard
(74) Attorney, Agent, or Firm—Kenneth A. Haas

(57) ABSTRACT

Remote units (113) having large amounts of data to transmit will be dynamically assigned Orthogonal Variable Spreading Factor (OVSF) codes corresponding to higher data rates and remote units (113) with lower amounts of data to be transmitted will be assigned OVSF codes corresponding to lower data rates. Additionally, in an alternate embodiment of the present invention, once system interference becomes greater than a predetermined threshold, the data rate between the base station (100) and remote units (113) in communication with the base station (100) is reduced. The reduction of the data rate between the base station (100) and remote units (113) occurs by changing the current OVSF codes utilized by both the remote units (113) and the base station (100).

5 Claims, 6 Drawing Sheets

DATA TRANSMISSION WITHIN A SPREAD-SPECTRUM COMMUNICATION SYSTEM

FIELD OF THE INVENTION

The present invention relates generally to cellular communication systems and, in particular, to data transmission within a spread-spectrum communication system.

BACKGROUND OF THE INVENTION

Communication systems are well known and consist of many types including land mobile radio, cellular radiotelephone, personal communication systems, and other communication system types. Within a communication system, transmissions are conducted between a transmitting device and a receiving device over a communication resource, commonly referred to as a communication channel, To date, the transmissions have typically consisted of voice signals. More recently, however, it has been proposed to carry other forms of signals, including high-speed data signals. For ease of operation, it is preferable to have the data transmission capability overlay the existing voice communication capability, such that its operation is essentially transparent to the voice communication system while still utilizing the communication resources and other infrastructure of the voice communication system.

One such communication system currently being developed with transparent data transmission capabilities is the next generation Code-Division Multiple-Access (CDMA) cellular communication system, more commonly referred to as Universal Mobile Telecommunications System (UMTS) Wideband cdma, or cdma2000. Remote unit data transmission within a Wideband communication system takes place by assigning the remote unit a high-speed data channel (referred to as a dedicated data channel) and transmitting data utilizing the dedicated data channel.

Typically, as a remote unit moves to a periphery of a serving base site coverage area, the transmit power of the communication unit as well as the transmit power of the base site must be increased to account for an increase in path losses between the serving base site and the remote unit. Even with the increase in transmit power, oftentimes an increase in system interference/noise will prevent data transmission between the remote unit and the base station at higher data rates. More particularly, even though transmissions between the remote unit and the base station occur utilizing high-speed data channels, the retransmission of data due to increased system interference effectively reduces the data rate of the dedicated data channels. The continued high-speed data transmission, and subsequent retransmission, contribute to overall system interference. Additionally, for downlink transmissions there exists a shortage of available channels to utilize in the transmission of data from the base station. The continued transmission and retransmission of data occupies the dedicated data channels for lengthy periods of time. Therefore a need exists for a method and apparatus for data transmission within a communication system that does not occupy dedicated data channels for lengthy periods of time, and does not contribute to overall system interference when an system noise prevents high-speed data transmission.

DETAILED DESCRIPTION OF THE DRAWINGS

Figure 1:
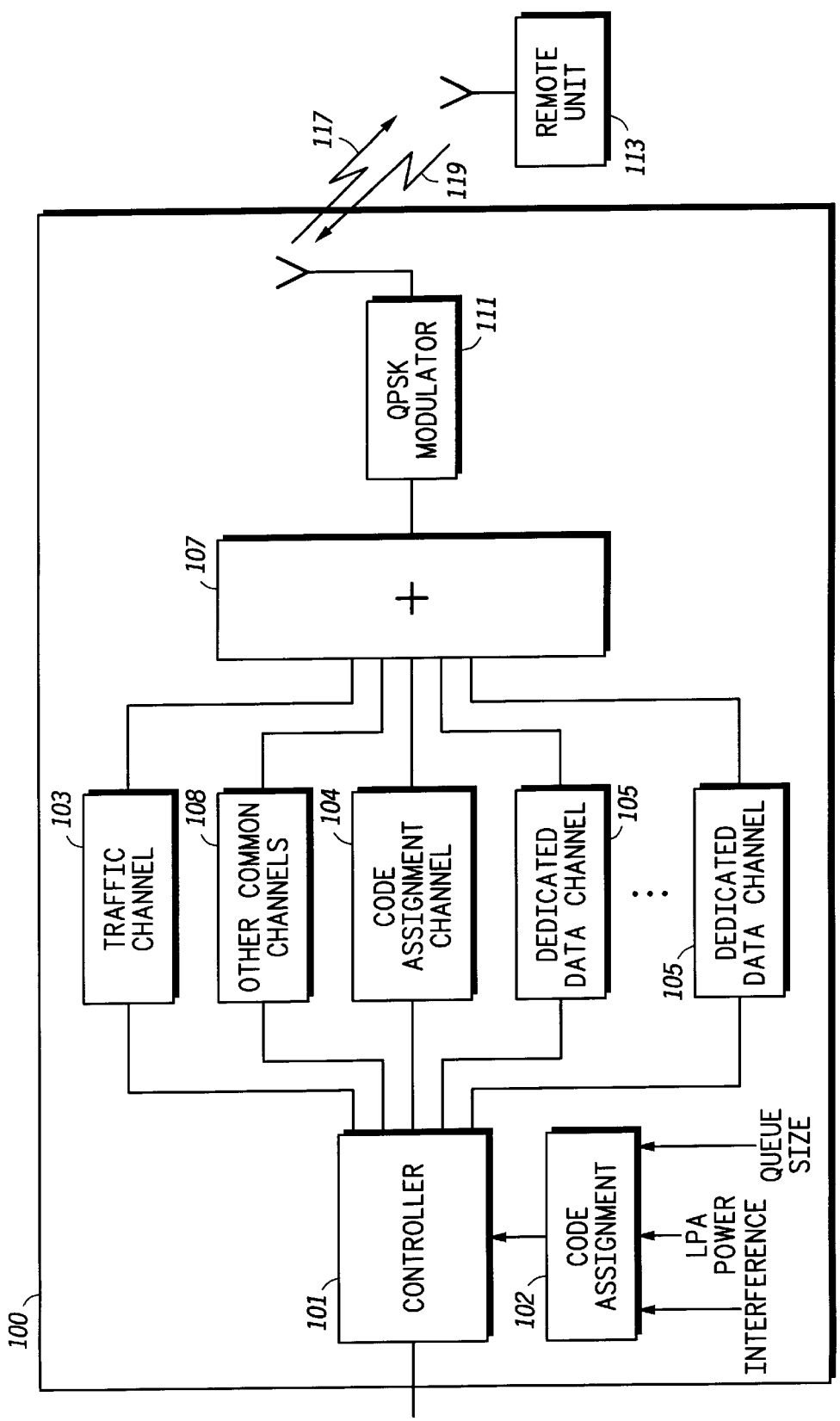
FIG. 1 is a block diagram of a base station for transmitting data in accordance with the preferred embodiment of the present invention.

To address the need for a communication system that does not occupy dedicated data channels for lengthy periods of time, and does not excessively contribute to overall system interference, a method and apparatus for data transmission within a communication system is provided. During operation remote units having large amounts of data to transmit will be dynamically assigned Orthogonal Variable Spreading Factor (OVSF) codes corresponding to higher data rates and remote units with lower amounts of data to be transmitted will be assigned OVSF codes corresponding to lower data rates. Additionally, in an alternate embodiment of the present invention, once system interference becomes greater than a predetermined threshold, the data rate between the base station and remote units in communication with the base station is reduced. In the alternate embodiment of the present invention the reduction of the data rate between the base station and remote unit occurs by changing the current OVSF codes utilized by both the remote units and the base station.

The present invention encompasses a method for data transmission within a spread spectrum communication system. The method comprises the steps of determining an amount of data to be transmitted to a remote unit and assigning the remote unit a first Orthogonal Variable Spreading Factor (OVSF) code having a length based upon the amount of data to be transmitted to the remote unit.

The present invention additionally encompasses a method for data transmission within a spread spectrum communication system. The method comprising the steps of transmitting a first and a second Orthogonal Variable Spreading Factor (OVSF) code to a first and a second remote unit over a code assignment channel, wherein the common channel utilizes a fixed length OVSF code. First data is transmitted over a first dedicated data channel to the first remote unit utilizing the first OVSF code during a first frame and second data is transmitted over a second dedicated data channel to the second remote unit utilizing the second OVSF code during the first frame. A third OVSF code is transmitted to the first remote unit over the code assignment channel third data is transmitted to the first remote unit utilizing the third OVSF code during a second frame.

Finally, the present invention encompasses an apparatus for transmission of data within a spread spectrum communication system, the apparatus comprises a code assignment channel outputting a first, and a second Orthogonal Variable Spreading Factor (OVSF) code to a first and a second remote unit utilizing a fixed length OVSF code, the code assignment channel additionally outputting a third OVSF code to the first remote unit utilizing the fixed length OVSF code, a first dedicated data channel outputting first data within a first frame to the first remote unit utilizing the first OVSF code and outputting second data within a second frame to the first remote unit utilizing the third OVSF code within a second frame, and a second dedicated data channel outputting third data within the first frame to the second remote unit utilizing the second OVSF code.

FIG. 1 is a block diagram of base station 100 for transmitting data to remote unit 113 in accordance with the preferred embodiment of the present invention. In the preferred embodiment of the present invention, base station 100 utilizes a next generation CDMA architecture as described in the UMTS Wideband cdma SMG2 UMTS Physical Layer Expert Group Tdoc SMG2 UMTS-L1 221/98 (UMTS 221/98). However, base station 100 may utilize other system protocols such as the cdma2000 International Telecommunication Union-Radio Communication (ITU-R) Radio Transmission Technology (RTT) Candidate Submission document, the next generation Global System for Mobile Communications (GSM) protocol, or the CDMA system protocol as described in Cellular System Remote unit-Base Station Compatibility Standard of the Electronic Industry Association/Telecommunications Industry Association Interim Standard 95C (IS-95C). Base station 100 comprises base station controller 101, multiple remote units 113 (only one shown), multiple traffic channels 103, one or more dedicated data channels 105, code assignment channel 30 104, code assignment circuitry 102, summer 107, and modulator 111. In the preferred embodiment of the present invention, all network elements are available from Motorola, Inc. (Motorola Inc. is located at 1301 East Algonquin Road, Schaumburg, Ill. 60196). As shown, base station 100 is communicating to remote unit 113 via downlink communication signal 117, and remote unit 113 is communicating to base station 100 via uplink communication signal 119. It is contemplated that network elements within communication system 100 are configured in well known manners with processors, memories, instruction sets, and the like, which function in any suitable manner to perform the function set forth herein.

In the preferred embodiment, the code assignment channel is used for assigning channelization codes to all remote units in communication with base station 100. In the preferred embodiment of the present invention channelization codes are Orthogonal Variable Spreading Factor (OVSF) codes selected from the hierarchy of such codes described in detail in "Tree Structured Generation of Orthogonal Spreading Codes with different lengths for Forward Link of DS-CDMA Mobile Radio," Electronics Letters, Jan. 2, 1997, pp.27–28, by F. Adachi, M. Sawahashi, and K. Okawa.

Traffic channels 103 are similar to existing CDMA traffic channels, and are used for voice and signaling. As described in UMTS 221/98, the transmission rate of this channel may vary dynamically. Additionally, soft handoff (simultaneous communication utilizing more than one traffic channel 103) is supported utilizing traffic channel circuitry 103.

Other common channel 108 includes channels such as a paging channel (PCH), broadcast channel (BCH), forward access channel (FACH), synchronization channel (SCH), as well as other known channels.

As discussed above, dedicated data channels 105 are utilized for communicating high data rate services to remote unit 113. In the preferred embodiment of the present invention the data rate of the dedicated data channels is allowed to vary based on an amount of data to be transmitted, system interference, and amplifier power output.

Data transmission from base station 100 in accordance with the preferred and alternate embodiments of the present invention occurs as follows: During time periods where remote unit 113 is not actively communicating to base station 100 utilizing either a traffic channel, or a dedicated data channel, remote unit 113 is actively or periodically monitoring a forward control channel (UMTS downlink shared control channel) for notification of any pending transmission by base station 100. In particular, downlink shared control channel circuitry (not shown) is utilized to send messages to remote unit 113 indicating pending downlink transmissions. In the preferred embodiment of the present invention, downlink shared control channels circuitry is similar to that described in UMTS 221/98. Base station 100 determines that a high data rate transmission to remote unit 113 needs to take place and determines if dedicated data channel circuitry 105 is available for utilization. Due to the limited number of dedicated data channels available for communication, a dedicated data channel may not be immediately available for transmission to remote unit 113. Once dedicated data channel circuitry 105 becomes available, remote unit 113 is notified of a pending data transmission (via a downlink shared control channel) and assigns remote unit 113 a spreading code (Walsh Code) utilized by dedicated data channel 105. Data transmission then begins utilizing dedicated data channel 105.

As discussed above, during data transmission there may exist a shortage of available OVSF codes. Additionally system interference may effectively reduce the transmission rate between base station 100 and remote unit 113 even though both base station 100 and remote unit 113 continue to transmit at a high data rate. In order to address these problems, in the preferred and alternate embodiments of the present invention code assignment circuitry 102 detects a system load and an overall system interference and notifies base station controller 101 when an OVSF code should be changed. In particular, remote units having large amounts of data to transmit will be dynamically assigned OVSF codes corresponding to higher data rates. Additionally, in the alternate embodiment of the present invention, once system interference becomes greater than a predetermined threshold, the data rate between base station 100 and remote units in communication with base station 100 is reduced. In both embodiments of the present invention the reduction or increase in the data rate between base station 100 and remote unit 113 occurs by changing the current spreading codes (OVSF codes) utilized by both remote unit 113 and base station 100.

Figure 2:
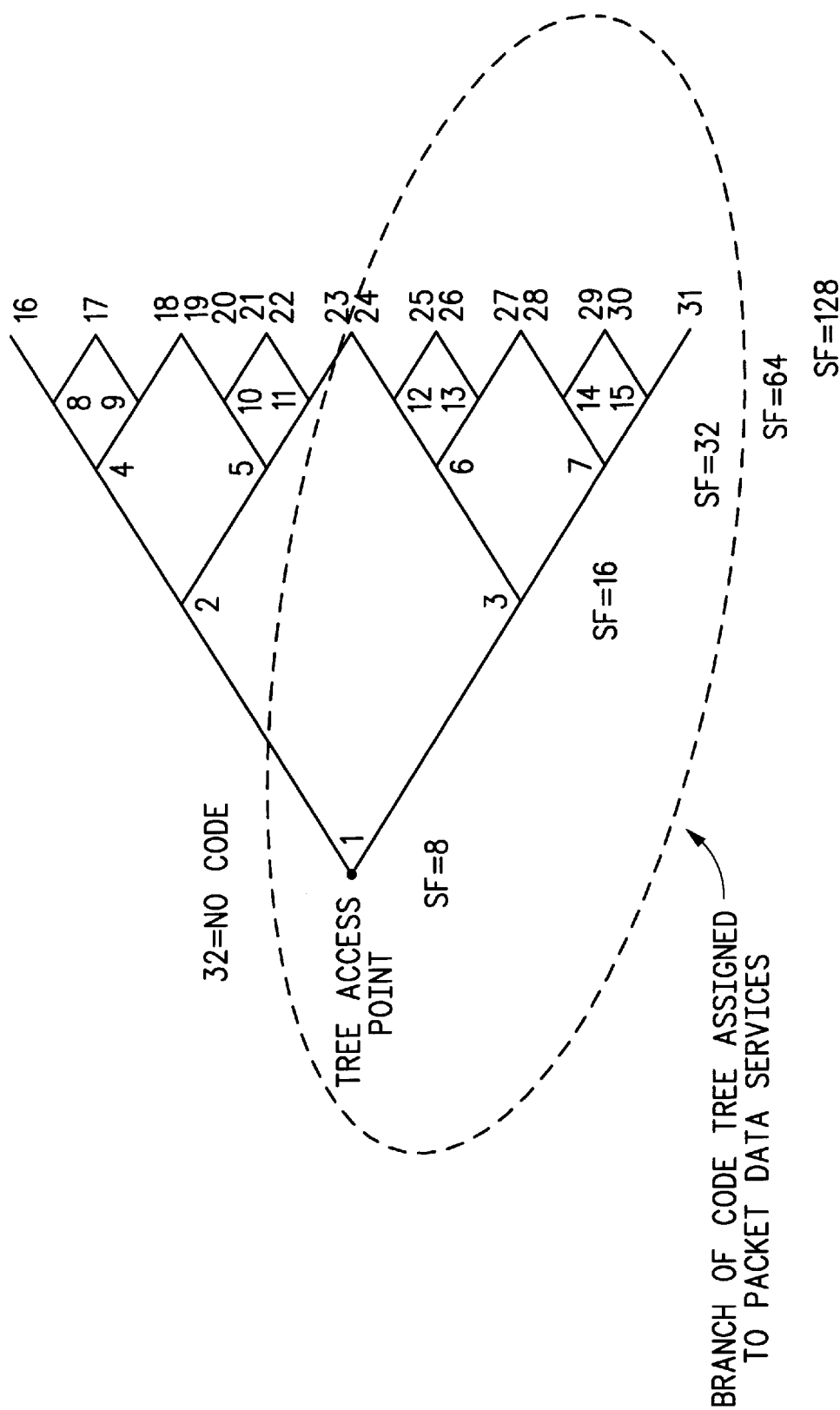
FIG. 2 is an illustration of the assignment of orthogonal variable spreading factor codes in accordance with the preferred embodiment of the present invention.

In both embodiments of the present invention OVSF codes are changed by utilizing a downlink code assignment channel that utilizes a single fixed unique OVSF code known to the remote units in communication with base station 100. Each remote unit 113 in communication with base station 100 is allocated a downlink and uplink dedicated data channel without a permanent OVSF code assignment. Thus the OVSF codes assigned to each remote unit 113 can change on a frame by frame basis. OVSF codes are assigned as described in UMTS 221/98, section 4.3.2. As described in section 4.3.2, and illustrated in FIG. 2, a segment of the code tree is assigned for packet data services (e.g.., nodes 3, 6, 7, 12, 13, 14, 15, and 24–31). For higher data rates, requiring lower spreading factors, fewer codes are available. Thus, as shown in FIG. 2, at the highest data rate (utilizing code 1, and a spreading factor of 8) only a single channel (code) is available for utilization. As the spreading factors increase, and the data rates decrease, and as such more channels become available such that at a spreading factor of 128, 16 channels become available for utilization.

Varying a user's spreading code allows for data transmission rates to vary accordingly, decreasing system interference. Additionally varying a user's spreading code allows for many users to share the limited channels available by assigning a code to a user for a limited time and bursting data to the user. After an amount data has been transmitted to the user, the particular code then can be reassigned to another user for data transmission. As an example, in a first frame transmitted from base station 100, a first user may be assigned code 6, a second packet user code 14, and a third packet user code 31, while in the next frame transmitted from base station 100 the first user is assigned code 24, the second packet user is assigned code 13, while the code assigned to the third user remains unchanged.

Figure 3:
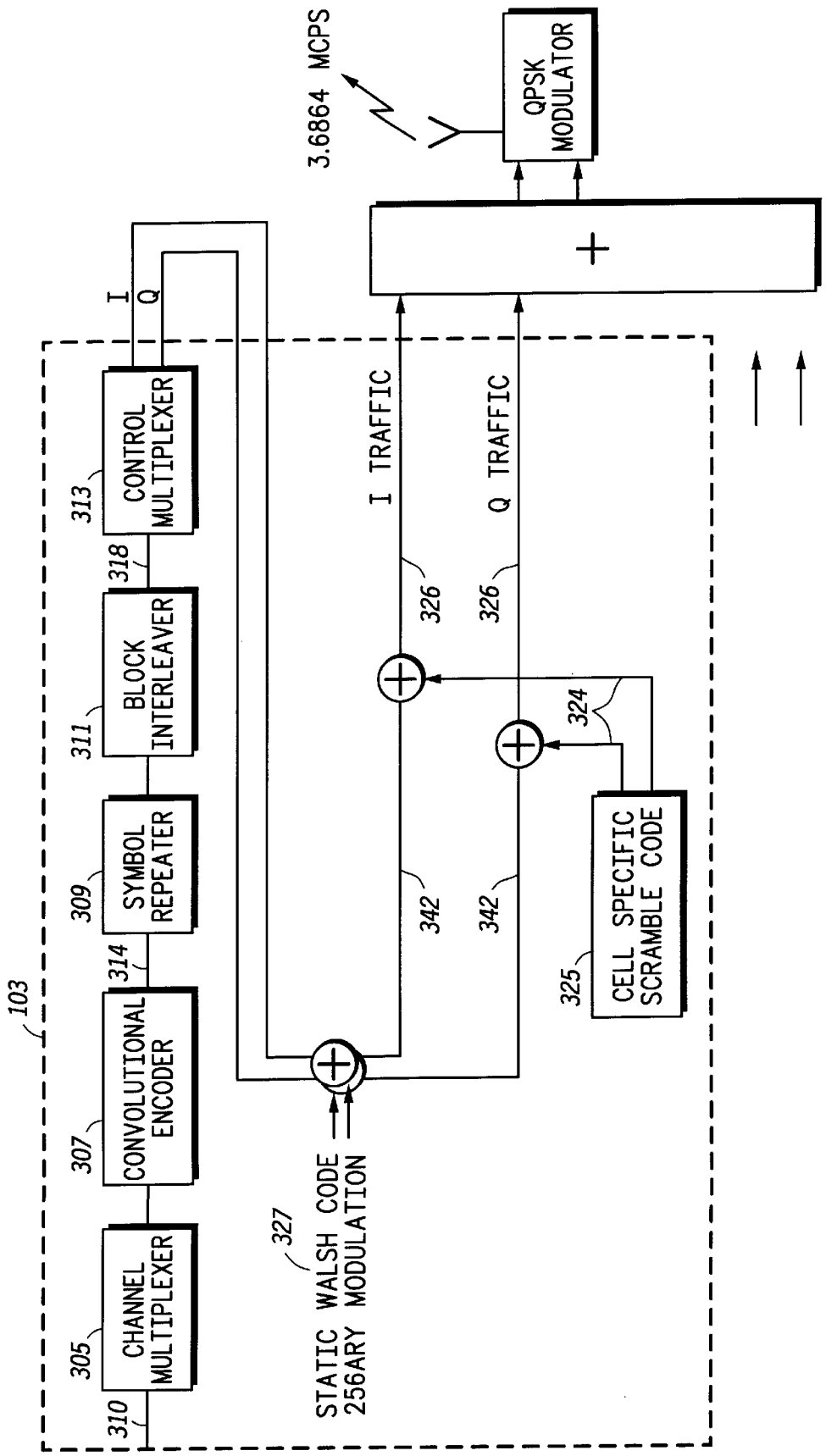
FIG. 3 is a block diagram of a code assignment channel of FIG. 1 for assigning a proper orthogonal code to a remote unit in accordance with the preferred embodiment of the present invention.

FIG. 3 is a block diagram of code assignment channel of FIG. 1 for assigning a proper orthogonal code to a remote unit in accordance with the preferred embodiment of the present invention. Code assignment channel 103 includes channel multiplexer 305, convolutional encoder 307, symbol repeater 309, block interleaver 311, control multiplexer 313, orthogonal encoder 327, and scrambler 325. During operation, data 310 is received by channel multiplexer 305 at a particular bit rate. Data bits 310 include remote unit ID information and a particular OVSF code assignment for the remote unit. An example of data bits 310 is illustrated in table 1.

TABLE 1

Downlink remote unit OVSF assignment transmitted by code assignment channel.

| Field | Bits | Reference |
|---|---|---|
| ID | 6 | A 6-bit temporary ID providing equivalent resolution as GPRS (Slot + USF <=> 3 + 3) used to identify an allocation. |
| OVSF Code Assignment | 7 | Assigns a specific branch of the code tree. |

Channel multiplexer 305 multiplexes data, and/or control and signaling traffic onto the data 310 and outputs the multiplexed data to convolutional encoder 307. Convolutional encoder 307 encodes input data bits 310 into data symbols at a fixed encoding rate with an encoding algorithm which facilitates subsequent maximum likelihood decoding of the data symbols into data bits (e.g. convolutional or block coding algorithms). For example, convolutional encoder 307 encodes input data bits 310 at a fixed encoding rate of one data bit to three data bits (i.e., rate 1/3) such that convolutional encoder 307 outputs data symbols 314 at a 32 ksymbol/second rate. At 32 ksymbol/second, using rate 1/3 encoding, 6 remote unit OVSF assignments can be made per 10 millisecond frame.

Data symbols 314 are then repeated by repeater 309 and input into interleaver 311. Interleaver 311 interleaves the input data symbols 314 at the symbol level. In interleaver 311, data symbols 314 are individually input into a matrix which defines a predetermined size block of data symbols 314. Data symbols 314 are input into locations within a matrix so that the matrix is filled in a column by column manner. Data symbols 314 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 318 are output by interleaver 311 at the same data symbol rate that they were input (e.g., 32 ksymbol/second). The predetermined size of the block of data symbols defined by the matrix is derived from the maximum number of data symbols which can be transmitted at a predetermined symbol rate within a predetermined length transmission block.

Interleaved data symbols 318 have control information added and are passed to orthogonal encoder 327. Orthogonal encoder 327 modulo 2 adds a fixed, non-varying orthogonal code having a first length (e.g., a 256-ary Walsh code) to each interleaved and scrambled data symbol 318. For example, in 256-ary orthogonal encoding, interleaved and scrambled data symbols 318 are each exclusive OR'd by a 256 symbol orthogonal code. These 256 orthogonal codes preferably correspond to Walsh codes from a 256 by 256 Hadamard matrix wherein a Walsh code is a single row or column of the matrix. Orthogonal encoder 327 repetitively outputs a Walsh code which corresponds to input data symbol 318 at a fixed symbol rate.

Sequence of Walsh codes 342 are output to a mixer (not shown) where they are gain controlled. In the preferred embodiment of the present invention Walsh codes 342 are amplified by a fixed, non-varying amount. The power adjusted sequence of Walsh codes are then further spread by a pair of cell-specific scrambling codes 324 to generate an I-channel and Q-channel code spread sequence 326. The I-channel and Q-channel code spread sequences 326 are used to bi-phase modulate a quadrature pair of sinusoids by driving the power level controls of the pair of sinusoids. The sinusoids output signals are summed, QPSK modulated (by modulator 115) and radiated by antenna to complete transmission of channel data bits 310. In the preferred embodiment of the present invention, spread sequences 326 are output at a rate of 4.096 Mega Chips per second (Mcps) and radiated within a 5 MHz bandwidth, but in alternate embodiments of the present invention, spread sequences 326 may be output at a different rate and radiated within a different bandwidth.

Figure 4:
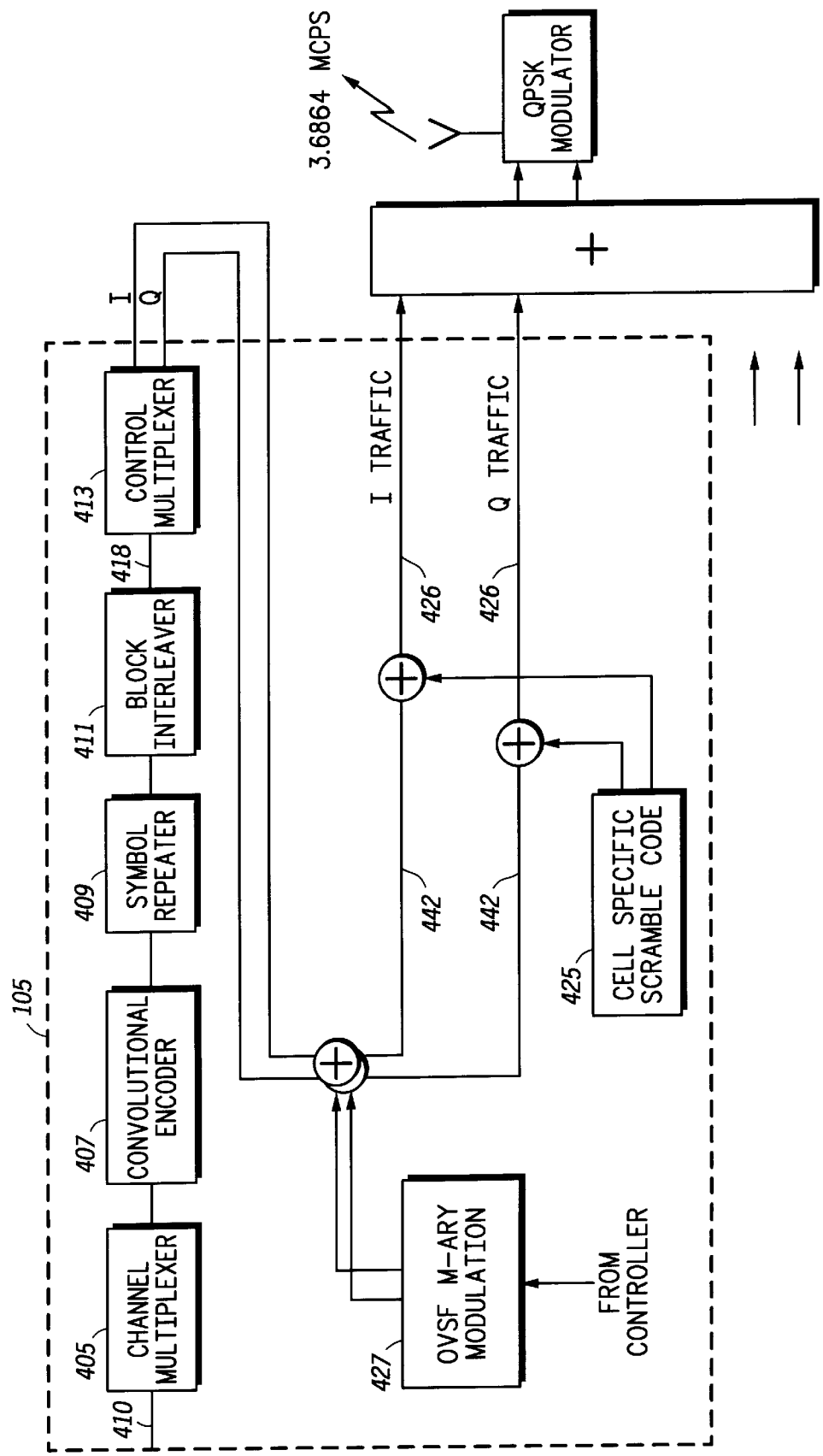
FIG. 4 is a block diagram of a dedicated data channel of FIG. 1 for transmitting data in accordance with the preferred embodiment of the present invention.

FIG. 4 is a block diagram of dedicated data channel circuitry 105 of FIG. 1 for transmitting data in accordance with the preferred embodiment of the present invention. Dedicated data channel circuitry 105 includes channel multiplexer 405, 30 convolutional encoder 407, symbol repeater 409, block interleaver 411, control multiplexer 413, orthogonal encoder 427, and scrambler 425. Operation of dedicated data channel circuitry 105 occurs in a similar manner as traffic channel circuitry 103 except that orthogonal encoder 427 modulo 2 adds an orthogonal code having a variable length (e.g., a length-M Walsh code) to each interleaved and scrambled data symbol 418. These M-length orthogonal codes preferably correspond to Walsh codes from a M by M Hadamard matrix wherein a Walsh code is a single row or column of the matrix. In both embodiments of the present invention orthogonal encoder 427 is instructed by controller 101 as to what particular orthogonal code to utilize. For example, in the preferred embodiment of the present invention remote units having large amounts of data to transmit can be assigned a first length Walsh code (e.g., length 16) while remote units having small amounts of data to transmit can be assigned a second length Walsh code (e.g., length 128). In the alternate embodiment of the present invention, during time periods of little interference a Walsh code having a first length (e.g., length 32) may be utilized, however, if code assignment circuitry 102 detects a rise in interference, a Walsh code having a second length (e.g., length 128) may be utilized. As discussed above, orthogonal encoder 427 can change Walsh codes at the frame rate, allowing for consecutive frames transmitted to a particular remote unit to have differing OVSF codes (Walsh codes), where the OVSF code utilized is based on an interference level.

Varying a user's spreading code allows for data transmission rates to vary accordingly, decreasing system interference. Additionally varying a user's spreading code allows for many users to share the limited channels available by assigning a code to a user for a limited time and bursting data to the user over that period of time. After an amount data has been transmitted to the user, the particular code then can be reassigned to another user for data transmission.

Figure 5:
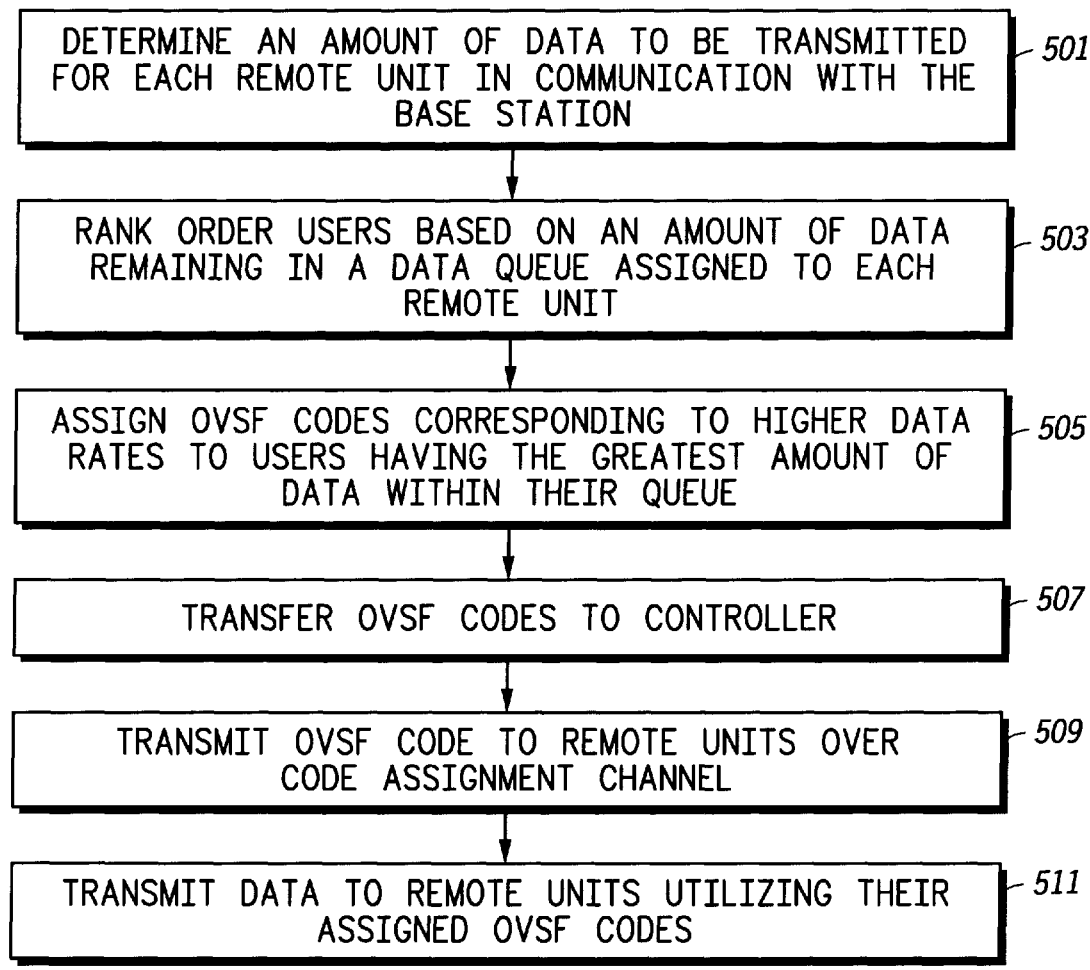
FIG. 5 is a flow chart illustrating operation of the base station of FIG. 1 in accordance with the preferred embodiment of the present invention.

FIG. 5 is a flow chart illustrating operation of base station 100 in accordance with the preferred embodiment of the present invention. In the preferred embodiment of the present invention a users OVSF code is periodically changed at a frame rate. Although many advantages can be envisioned for changing a users OVSF code at a frame rate (e.g., more data users than OVSF codes available, reducing system interference, lowering an individual users transmission rate based on an amount of data to be transmitted to a user, . . . , etc.) in the preferred embodiment of the present invention a user's code is changed based on an amount of data that is to be transmitted to a particular user. For example, a substantial amount of data may need to be transmitted to a first user, with very little data needed to be transmitted to a second user. In the preferred embodiment of the present invention users with a substantial amount data to be transmitted will be assigned an OVSF code corresponding to a higher data rate than users with little data needed to be transmitted.

The logic flow begins at step 501 where code assignment block 102 determines an amount of data to be transmitted for each remote unit 113 in communication with base station 100. In the preferred embodiment of the present invention this is accomplished by determining an amount of data remaining in a data queue assigned to each remote unit 113. Next, at step 503 all user's having queued data are rank ordered based on an amount of data within each user's queue. At step 505 OVSF codes corresponding to higher data rates are assigned to users having the greatest amount of data within their queue. For example, base station 100 may be communicating with four remote units 113, each having a differing amount of data within their queues. If the first and second remote unit have very little data to be transmitted they may be assigned codes with a spreading factor corresponding to a lower data rate (e.g., codes 24 and 25 of FIG. 2). If the third remote unit has more data to be transmitted than the first two remote units, and has less data to be transmitted than the fourth remote unit, the third remote unit will be assigned a code (e.g., code 13 of FIG. 2) corresponding to an intermediate data rate and the fourth remote unit will be assigned a code (e.g., code 7 of FIG. 2) corresponding to the highest data rate available. Thus in the preferred embodiment of the present invention an OVSF code assigned to a particular remote unit has a length that is based upon an amount of data to be transmitted to the remote unit. It should be noted that in the preferred embodiment of the present invention OVSF code assignment is made on a frame-by-frame bases. In other words, for every frame that is transmitted from base station 100, a differing OVSF code may be assigned as described above. Therefore, in accordance with the preferred embodiment of the present invention a first and a second OVSF code may be utilized by a first and a second remote unit during a first frame, while in the very next frame, a third and a fourth OVSF code may be utilized by the first and the second remote unit. Additionally, the OVSF codes assigned to each remote unit are transmitted to the remote units as described above with reference to FIG. 3.

At step 507 the OVSF codes and corresponding remote unit identification information is transferred to controller 101. Controller 101 transmits this information to remote units over code assignment channel 104 (step 509). Finally, at step 511, data is transmitted to the individual remote units utilizing their assigned OVSF codes.

Figure 6:
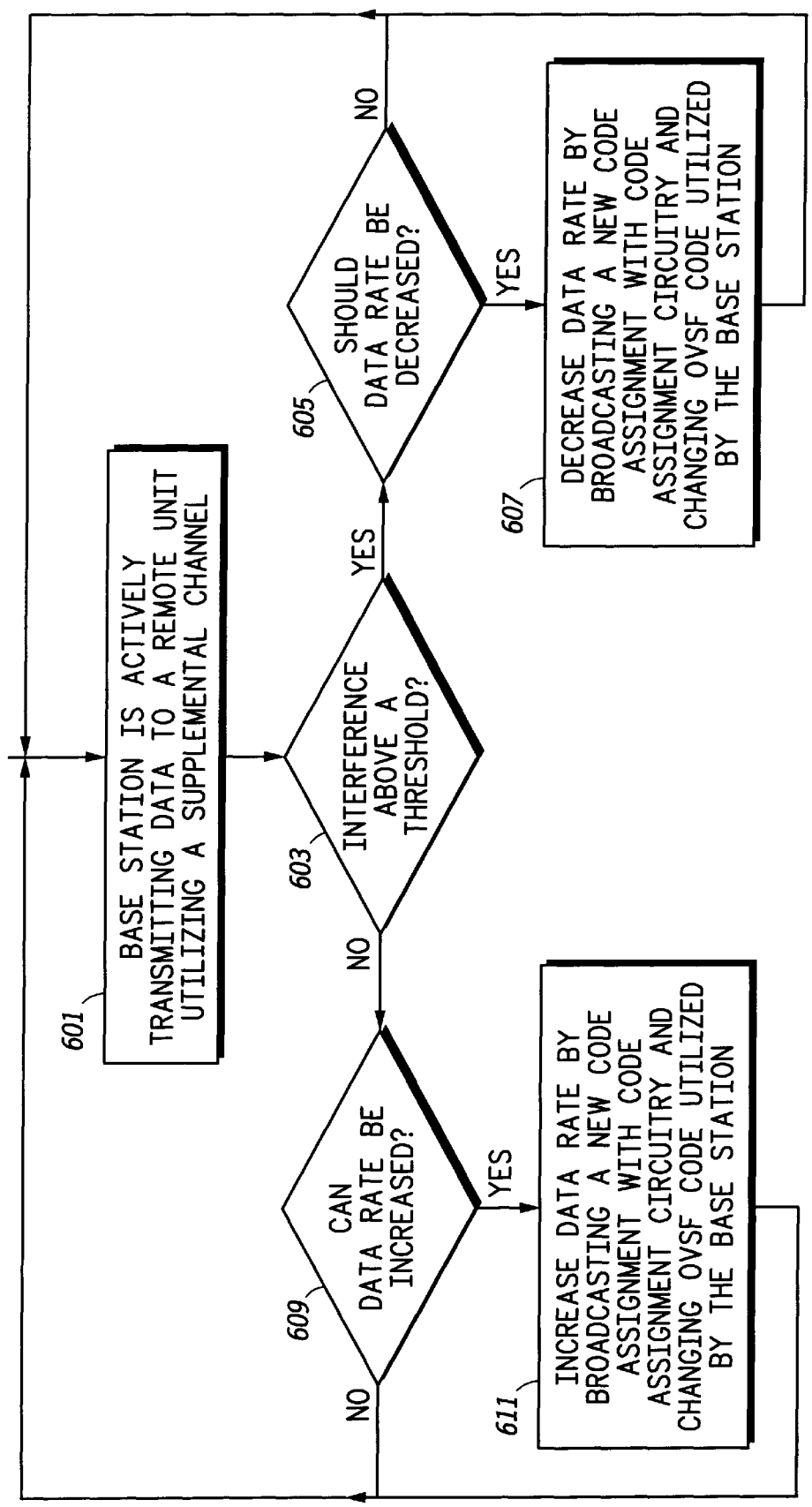
FIG. 6 is a flow chart illustrating operation of the base station of FIG. 1 in accordance with an alternate embodiment of the present invention.

FIG. 6 is a flow chart illustrating operation of base station 100 in accordance with an alternate embodiment of the present invention. The logic flow begins at step 601 where base station 100 is actively transmitting data to remote unit 113 utilizing dedicated data channel circuitry 105. At step 603 code assignment circuitry 102 determines if system interference is above a threshold. The interference level is detected at remote unit 113 and is a function of the energy per chip per received interference detected (Ec/Io). The Ec/Io is detected by remote unit 113 and is communicated to base station 100 via a dedicated or random access channel as part of standard messaging within a UMTS Wideband CDMA system.

Continuing, if at step 603 it is determined that system interference is above a threshold, then the logic flow continues to step 605 where it is determined if the data transmission rate needs to be further decreased. If at step 605 it is determined that the data transmission rate needs to be decreased, then the logic flow continues to step 607 where the data transmission rate is decreased, otherwise the logic flow returns to step 601. In the preferred embodiment of the present invention the data transmission rate is decreased by simultaneously broadcasting a new code assignment with code assignment channel 104, and changing the current OVSF code utilized by orthogonal encoder 427. For example, if orthogonal encoder 427 was utilizing a length 16 orthogonal code (corresponding to 256 ksymbols/sec) the symbol rate could be lowered to 32 ksymbols/sec by changing the OVSF code to a 128 length OVSF code. The logic flow then returns to step 601.

Returning to step 603, if at step 603 it is determined that system interference is not above the threshold, then the logic flow continues to step 609 where it is determined if the data transmission rate can be increased. If at step 609 it is determined that the data transmission rate can be increased, then the logic flow continues to step 611 where the data transmission rate is increased, otherwise the logic flow returns to step 601. In the preferred embodiment of the present invention the data transmission rate is increased by simultaneously broadcasting a new code assignment with code assignment channel 104, and changing the current OVSF code utilized by orthogonal encoder 427. For example, if orthogonal coder 427 was utilizing a length 128 OVSF code (corresponding to 32 ksymbols/sec), the symbol rate could be increased to 256 ksymbols/sec by changing the OVSF code to a length 16 orthogonal code. The logic flow then turns to step 601.

The descriptions of the invention, the specific details, and the drawings mentioned above, are not meant to limit the scope of the present invention. For example, although the preferred and alternate embodiments of the present invention were described above as it relates to changing downlink OVSF codes, one of ordinary skill in the art will recognize that uplink OVSF codes may be changed in a similar manner without varying from the scope of the present invention. In this case both downlink and uplink OVSF codes may be assigned by utilizing the same code assignment channel 104. It is the intent of the inventors that various modifications can be made to the present invention without varying from the spirit and scope of the invention, and it is intended that all such modifications come within the scope of the following claims and their equivalents.

What is claimed is:

1. A method for data transmission from a base station within a spread spectrum communication system, the method comprising the steps of:

determining data bits to transmit to a remote unit, wherein the data bits include a remote unit identification and a first Walsh (OVSF) code for use by the remote unit;

scrambling the data bits with a second Walsh (OVSF) code to produce scrambled data bits; and transmitting the scrambled data bits to the remote unit, wherein the remote unit utilizes the first Walsh (OVSF) code to receive high-speed data transmitted to the remote unit from the base station.

2. A method for data transmission from a base station within a spread spectrum communication system, the method comprising the steps of:

determining first data bits to transmit to a first remote unit from the base station, wherein the first data bits include a first remote unit identification and a first Walsh (OVSF) code for use by the remote unit;

determining second data bits to transmit to a second remote unit from the base station, wherein the second data bits include a second remote unit identification and a second Walsh (OVSF) code for use by the second remote unit, wherein the second Walsh (OVSF) code differs from the first Walsh (OVSF) code;

scrambling the first data bits with a third Walsh (OVSF) code to produce first scrambled data bits;

scrambling the second data bits with the third Walsh (OVSF) code to produce second scrambled data bits;

transmitting the first scrambled data bits to the first remote unit, wherein the first remote unit utilizes the first Walsh (OVSF) code to receive high-speed data transmitted to the first remote unit from the base station; and transmitting the second scrambled data bits to the second remote unit, wherein the second remote unit utilizes the second Walsh (OVSF) code to receive high-speed data transmitted to the second remote unit from the base station.

3. A method for data transmission from a base station within a spread spectrum communication system, the method comprising the steps of:

determining first data bits to transmit to a first remote unit from the base station, wherein the first data bits include a first remote unit identification and a first Walsh (OVSF) code for use by the remote unit;

scrambling the first data bits with a second Walsh (OVSF) code to produce first scrambled data bits;

transmitting the first scrambled data bits to the first remote unit, wherein the first remote unit utilizes the first Walsh (OVSF) code to receive high-speed data transmitted to the remote unit from the base station; and after the high-speed data has been transmitted to the first remote unit, transmitting second scrambled data bits to a second remote unit, wherein the second remote unit utilizes the first Walsh (OVSF) code to receive high-speed data transmitted to the second remote unit from the base station.

4. An apparatus comprising:

a static Walsh (OVSF) code scrambler having a remote unit identification and a first Walsh (OVSF) code as an input and outputting scrambled data, wherein the scrambled data comprises the remote unit identification and the first Walsh (OVSF) code scrambled by a second, static Walsh (OVSF) code; and a Cell Specific Scrambler having the scrambled data as an input and outputting the scrambled data further scrambled by a cell-specific scrambling code.

5. An apparatus comprising:

means for determining data bits to transmit to a remote unit, wherein the data bits include a remote unit identification and a first Walsh (OVSF) code for use by the remote unit;

means for scrambling the data bits with a second Walsh (OVSF) code to produce scrambled data bits; and means for transmitting the scrambled data bits to the remote unit, wherein the remote unit utilizes the first Walsh (OVSF) code to receive second data transmitted to the remote unit from a base station.

* * * * *